United States Patent
Sano et al.

[11] Patent Number: 5,456,988
[45] Date of Patent: Oct. 10, 1995

[54] ORGANIC ELECTROLUMINESCENT DEVICE HAVING IMPROVED DURABILITY

[75] Inventors: Takeshi Sano; Masayuki Fujita; Takanori Fujii; Yoshitaka Nishio; Yuji Hamada, all of Osaka; Kenichi Shibata, Wakayama; Kazuhiko Kuroki, Kyoto, all of Japan

[73] Assignee: Sanyo Electric Co., Ltd., Osaka, Japan

[21] Appl. No.: 9,472

[22] Filed: Feb. 1, 1993

[30] Foreign Application Priority Data

Jan. 31, 1992 [JP] Japan .................................. 4-016422
Mar. 31, 1992 [JP] Japan .................................. 4-077561
Dec. 4, 1992 [JP] Japan .................................. 4-325733

[51] Int. Cl.$^6$ ............................ H05B 33/14; H05B 33/20
[52] U.S. Cl. .......................... 428/690; 428/691; 428/917; 313/503; 313/504; 313/506
[58] Field of Search .................... 128/690, 917, 128/691; 313/503, 504, 506

[56] References Cited

U.S. PATENT DOCUMENTS

| | | | |
|---|---|---|---|
| 5,061,569 | 10/1991 | VanSlyke et al. | 428/457 |
| 5,142,343 | 8/1992 | Hosokawa et al. | 357/17 |
| 5,200,668 | 4/1993 | Ohashi et al. | 313/498 |
| 5,281,489 | 1/1994 | Mori et al. | 428/690 |

*Primary Examiner*—Charles R. Mold
*Attorney, Agent, or Firm*—Merchant, Gould, Smith, Edell, Welter & Schmidt

[57] ABSTRACT

An electroluminescent device having a hole injection electrode, an electron injection electrode, and at least an organic emitting layer therebetween, said organic emitting layer includes an 8-quinolinol derivative-metal complex whose ligand is selected from the group consisting of chemical formulas 102 through 106:

chemical formula 102

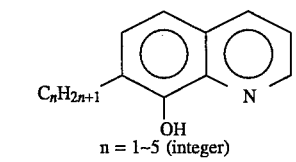

$n = 1\sim5$ (integer)

chemical formula 103

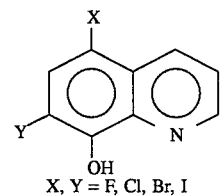

X, Y = F, Cl, Br, I chemical formula 104

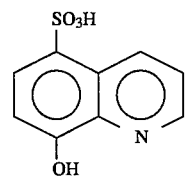

chemical formula 105

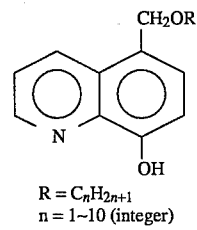

$R = C_nH_{2n+1}$
$n = 1\sim10$ (integer)

chemical formula 106

(Abstract continued on next page.)

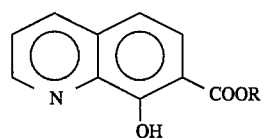
-continued
$R = C_nH_{2n+1}$
$n = 1\sim10$ (integer)
25 Claims, 3 Drawing Sheets

ORGANIC ELECTROLUMINESCENT DEVICE HAVING IMPROVED DURABILITY

BACKGROUND OF THE INVENTION

1. Field of the Invention

This invention relates to an organic electroluminescent device whose durability has been improved.

2. Related Arts

Recently, in accordance with the diversification of information apparatuses, the demand for flat-type display devices has been growing which manage with less electric power and smaller space than cathode-ray tubes (CRT). Included in such flat-type displays are crystalline liquid display devices and plasma display devices, and drawing special attention among them is an electroluminescent (hereinafter referred to as EL) device which is a self-luminescent type and can provide clear display.

Here, the EL devices can be divided between inorganic and organic depending on the constituent materials, the former having already been put to practical use.

However, such an inorganic EL device needs to be driven with high voltage because its driving type is a so-called 'collisional excitation type' wherein electrons accelerated by the impression of a high electrical field make the luminescence center luminesce through the collisional excitation. This construction brings about an increase in the cost of surrounding devices.

On the other hand, the organic EL device can be driven with low voltage because it exhibits so-called 'injection type luminescence' wherein charges (holes injected from an electrode and electrons injected from another) are combined with each other inside emitting materials to produce luminescence. It has another advantage of being able to easily produce any desired emitting colors by altering the molecular structure of the organic compound. Hence, such organic EL devices are very hopeful as new display devices.

The organic EL devices generally have either two-layer or three-layer structure. The two-layer structure has either SH-A structure wherein an emitting layer and a hole transport layer are formed between a hole injection electrode and an electron injection electrode, or SH-B structure wherein an emitting layer and an electron transport layer are formed between these electrodes. The three-layer structure has DH structure wherein an emitting layer, a hole transport layer, and an electron transport layer are formed between these electrodes. Used for such hole injection electrodes are materials having a large work function such as gold and ITO (In-Sn oxide), while used for such electron injection electrodes are materials having a small work function such as Mg. All the layers comprise organic materials: the hole transport layer comprises a material having p-type semiconductor characteristics, the electron transport layer comprises a material having n-type semi-conductor characteristics, and the emitting layer comprises a material having n-type semi-conductor characteristics when used in the SH-A structure, a material having p-type semi-conductor characteristics when used in the SH-B structure, and a material having characteristics close to neutral when used in the DH structure. Every structure described above is based on the common principle that holes injected from a hole injection electrode and electrons injected from an electron injection electrode are combined on the boundary surface between an emitting layer and a hole (or electron) transport layer as well as inside the emitting layer to produce luminescence.

Although the organic EL devices, as mentioned before, have advantages of being driven with low voltage, producing any desirable emitting colors theoretically, and the like, they still have a disadvantage of being pretty short in their life. This is because very few of the compounds used for the organic emitting layer or the organic electron transport layer can retain stable luminescence with good film-forming properties. Therefore, if an EL device is produced with such a compound, undesired precipitates might be caused between adjacent layers laminated, or the compound itself might deteriorate.

As for the organic emitting layer, 8-quinolinol-aluminum complex is conventionally used as an emitting material having stable life with good film-forming properties. No equivalents of the 8-quinolinol aluminum are found so far, which are greatly desired.

SUMMARY OF THE INVENTION

Therefore, the object of this invention is to provide a useful EL device that has excellent durability and retains stable luminescence for a long period of time by using a compound other than 8-quinolinol-aluminum complex as an emitting material.

The object can be achieved by an EL device having a hole injection electrode, an electron injection electrode, and at least an organic emitting layer therebetween, the organic emitting layer comprising an 8-quinolinol derivative-metal complex whose ligand is an 8-quinolinol derivative except 8-quinolinol.

The 8-quinolinol derivative may be selected from the group consisting of chemical formulas 101 through 106:

[chemical formula 101]

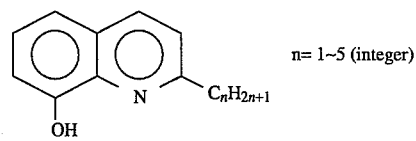

n= 1~5 (integer)

[chemical formula 102]

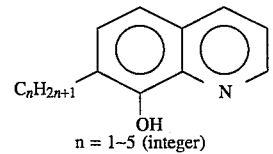

n = 1~5 (integer)

[chemical formula 103]

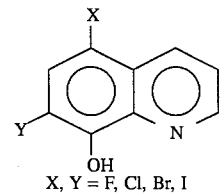

X, Y = F, Cl, Br, I

[chemical formula 104]

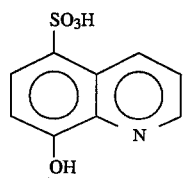

[chemical formula 105]

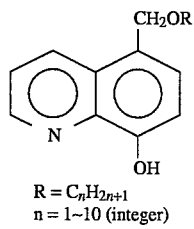

R = $C_nH_{2n+1}$
n = 1~10 (integer)

[chemical formula 106]

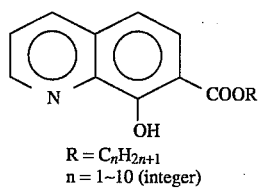

R = $C_nH_{2n+1}$
n = 1~10 (integer)

The metal of the 8-quinolinol derivative-metal complex may be selected from the group consisting of beryllium, magnesium, calcium, strontium, barium, scandium, yttrium, zinc, cadmium, aluminum, gallium, indium, lanthanum, cerium, samarium, europium, and terbium.

The EL device may have SH-A structure holding an organic hole transport layer between the hole injection electrode and the organic emitting layer.

The EL device may have DH structure holding an organic hole transport layer between the hole injection electrode and the organic emitting layer, and an organic electron transport layer between the organic emitting layer and the electron injection electrode.

The hole injection electrode may comprise one of polyvinylcarbazole shown in chemical formula 107 and a diamine derivative shown in chemical formula 108, while the organic emitting layer may comprise one of these compounds shown in chemical formulas 109 through 119:

[chemical formula 107]

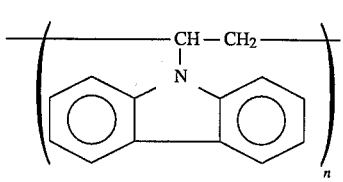

[chemical formula 108]

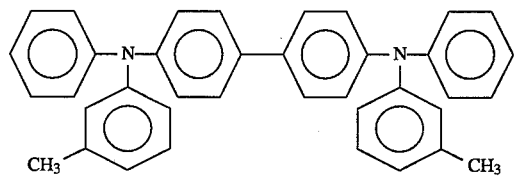

[chemical formula 109]

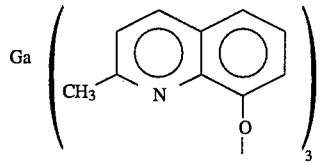

[chemical formula 110]

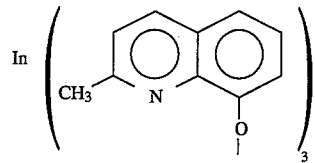

[chemical formula 111]

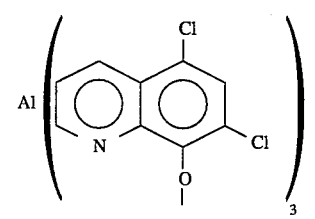

[chemical formula 112]

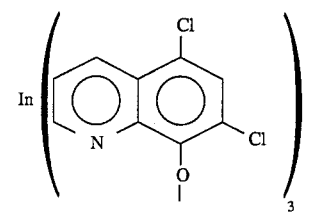

[chemical formula 113]

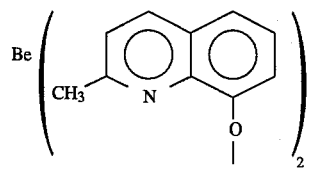

[chemical formula 114]

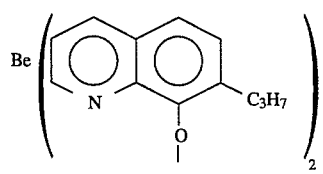

[chemical formula 115]

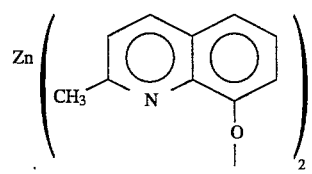

[chemical formula 116]

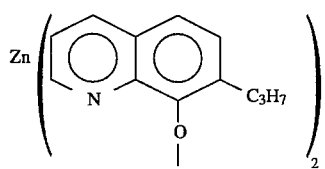

[chemical formula 117]

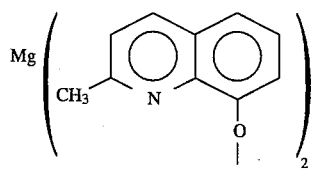

[chemical formula 118]

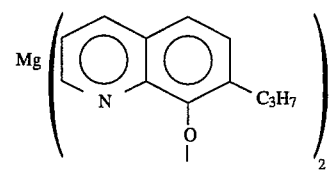

[chemical formula 119]

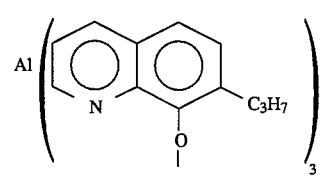

The organic hole transport layer may comprise a diamine derivative shown in chemical formula 120, the organic emitting layer may comprise a 2-methyl-8-quinolinol-beryllium complex shown in chemical formula 121, and the organic electron transport layer may comprise an oxadiazole derivative shown in chemical formula 122:

[chemical formula 120]

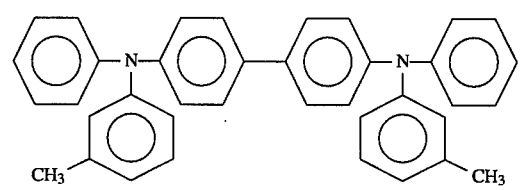

[chemical formula 121]

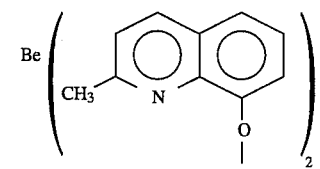

[chemical formula 122]

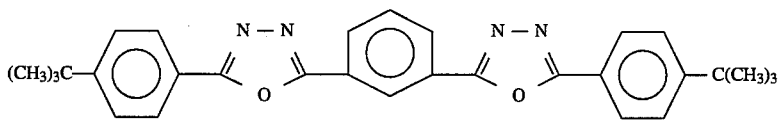

The 8-quinolinol derivative-metal complex may be used as a dopant.

The 8-quinolinol derivative-metal complex may be selected from the group consisting of chemical formulas 123 through 126:

[chemical formula 123]

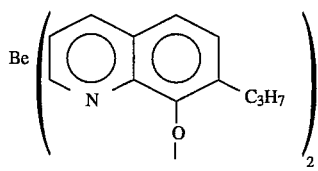

[chemical formula 124]

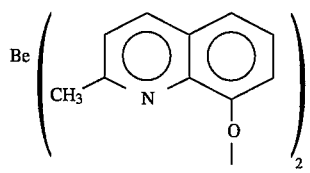

[chemical formula 125]

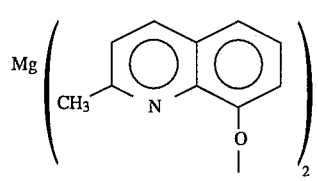

[chemical formula 126]

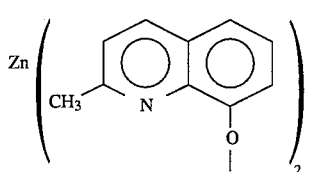

The 8-quinolinol derivative-metal complex may be used as a host material.

The 8-quinolinol derivative-metal complex may be selected from the group consisting of chemical formulas 127, 128, and 129:

[chemical formula 127]

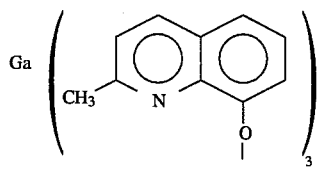

[chemical formula 128]

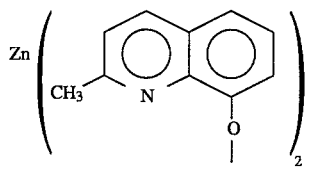

[chemical formula 129]

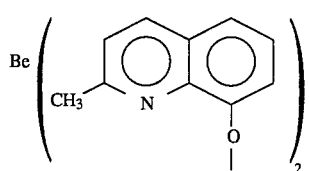

An EL device may have a hole injection electrode, an electron injection electrode, and at least an organic emitting layer therebetween, the organic emitting layer comprising a metal complex whose ligand is an 8-quinolinol shown in chemical formula 130, and whose metal is selected from the group consisting of beryllium, magnesium, calcium, strontium, barium, scandium, lanthanoid, zinc, cadmium, yttrium, gallium, and indium.

[chemical formula 130]

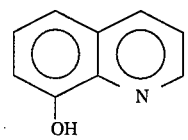

The EL device of claim 12 may have SH-A structure holding an organic hole transport layer between the hole injection electrode and the organic emitting layer.

The organic hole transport layer and the organic electron transport layer each may comprise a compound having larger exciton energy than the metal complex used for the organic emitting layer.

The hole injection electrode may comprise a diamine derivative shown in chemical formula 131, while the organic emitting layer may comprise one of these compounds shown in chemical formulas 132, 133, and 134:

[chemical formula 131]

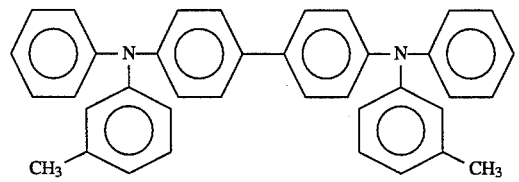

[chemical formula 132]

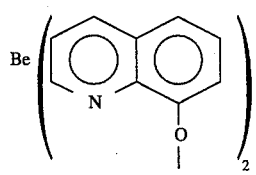

[chemical formula 133]

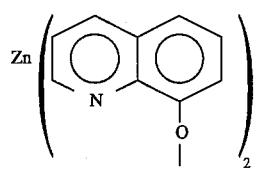

[chemical formula 134]

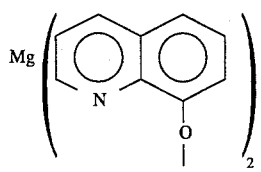

The metal complex may be used as a dopant.

The metal complex may be selected from the group consisting of chemical formulas 135, 136, and 137:

[chemical formula 135]

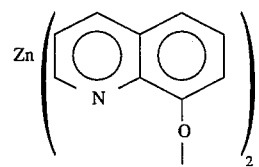

[chemical formula 136]

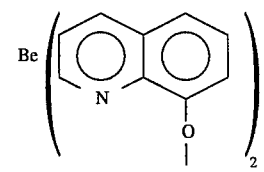

[chemical formula 137]

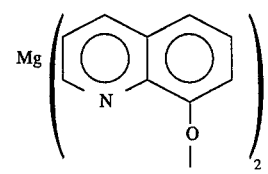

The metal complex may be used as a host material.

The metal complex may be one of these compounds shown in chemical formulas 138 and 139:

[chemical formula 138]

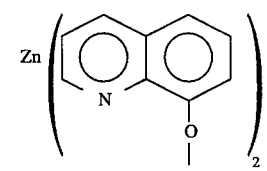

[chemical formula 139]

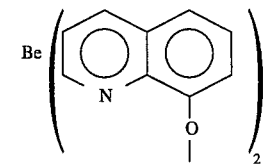

An EL device may have a hole injection electrode, an electron injection electrode, and at least an organic emitting layer therebetween, the organic emitting layer comprising one of a thiooxine-metal complex and a selenoxine-metal complex.

The metal of the metal complex may be selected from the group consisting of beryllium, magnesium, calcium, strontium, barium, scandium, yttrium, zinc, cadmium, aluminum, gallium, indium, lanthanum, cerium, samarium, europium, and terbium.

The EL device may have SH-A structure holding an organic hole transport layer between the hole injection electrode and the organic emitting layer.

The EL device may have DH structure holding an organic hole transport layer between the hole injection electrode and the organic emitting layer, and an organic electron transport layer between the organic emitting layer and the electron injection electrode.

The organic hole transport layer may comprise polyvinylcarbazole shown in chemical formula 140, the organic emitting layer may comprise one of these compounds shown in chemical formulas 141 and 142:

[chemical formula 140]

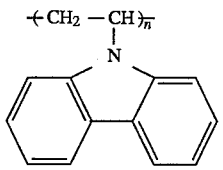

[chemical formula 141]

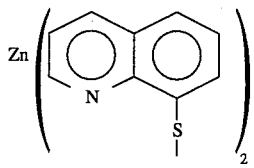

[chemical formula 142]

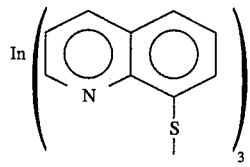

The metal complex may be used as a dopant.

The metal complex may be used as a host material.

An EL device may have a hole injection electrode, an electron injection electrode, and at least an organic emitting layer therebetween, the organic emitting layer comprising a host material and a dopant, the host material being an 8-quinolinol-aluminum complex.

An EL device may have a hole injection electrode, an electron injection electrode, and at least an organic emitting layer and an organic electron transport layer between the electrodes, the organic electron transport layer comprising an 8-quinolinol-metal complex whose ligand is an 8-quinolinol derivative.

The 8-quinolinol derivative may be selected from the group consisting of chemical formulas 143, 144, and 145:

[chemical formula 143]

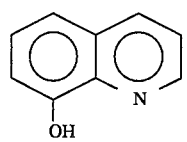

[chemical formula 144]

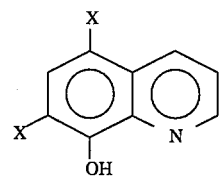

X = F, Cl, Br, I

[chemical formula 145]

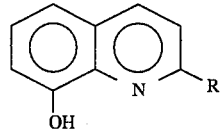

R = CnH2n + 1 (n = 1~5) (integer)

The metal of the 8-quinolinol derivative-metal complex may be selected from metals belonging to one of the II group and the III group in the periodic table.

The EL device may have SH-B structure holding the organic emitting layer and the organic electron transport layer between the electrodes.

The EL device may have DH structure holding an organic hole transport layer between the hole injection electrode and the organic emitting layer.

The organic emitting layer may comprise an oxadiazole derivative shown in chemical formula 146 and the organic electron transport layer may comprise a 2-methyl-8-quinolinol-gallium complex shown in chemical formula 147:

[chemical formula 146]

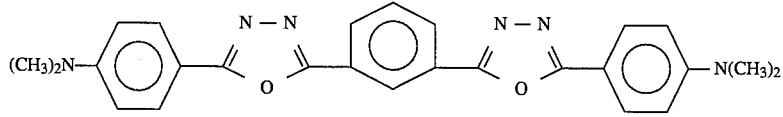

[chemical formula 147]

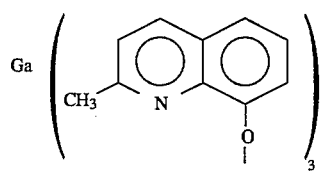

The organic emitting layer may comprise a perynone derivative shown in chemical formula 148, the organic hole transport layer may comprise polyvinylcarbazole shown in chemical formula 149, and the organic electron transport layer may comprise one of these compounds shown in chemical formulas 150 through 154:

[chemical formula 148]

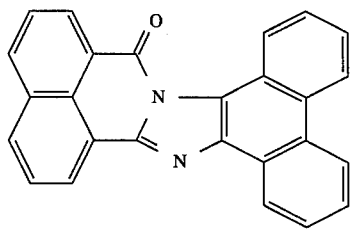

[chemical formula 149]

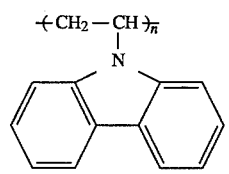

[chemical formula 150]

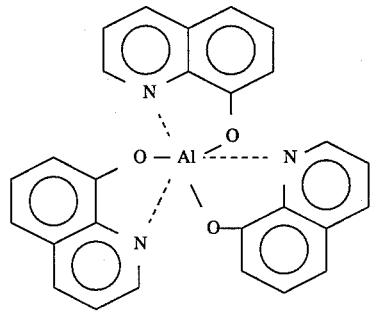

[chemical formula 151]

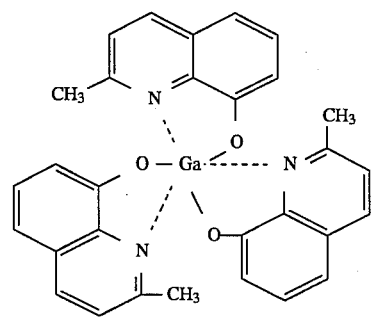

[chemical formula 152]

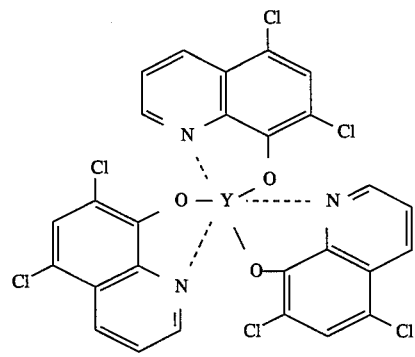

[chemical formula 153]

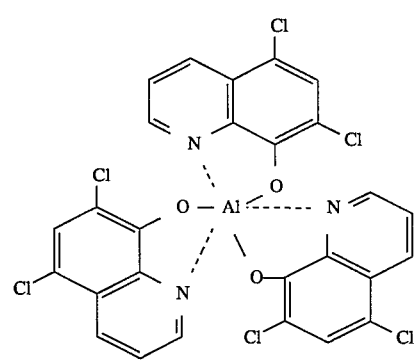

[chemical formula 154]

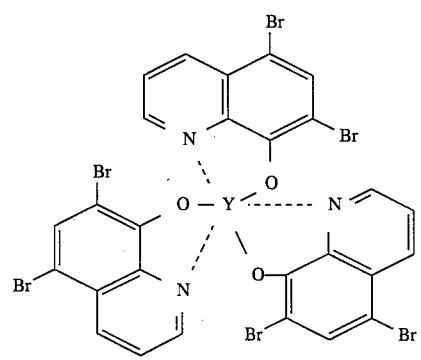

An EL device may have a hole injection electrode, an electron injection electrode, and at least an organic emitting layer and an organic electron transport layer between the electrodes, the organic electron transport layer comprising one of a thiooxine-metal complex and a selenoxine-metal complex.

The metal of the metal complex may be selected from metals belonging to one of the II group and the III group in the periodic table.

The EL device may have SH-B structure holding the organic emitting layer and the organic electron transport layer between the electrodes.

The EL device may have DH structure holding an organic hole transport layer between the hole injection electrode and the organic emitting layer.

The organic emitting layer may comprise a perynone derivative shown in chemical formula 155, the organic hole transport layer may comprise polyvinylcarbazole shown in chemical formula 156, and the organic electron transport layer may comprise a compound shown in chemical formula 157:

[chemical formula 155]

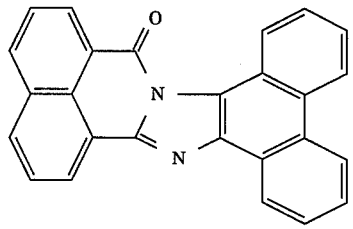

[chemical formula 156]

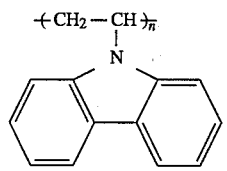

[chemical formula 157]

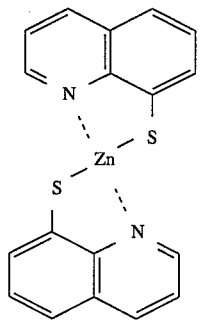

The following complexes of the present invention having as excellent film-forming properties and stability as the 8-quinolinol-aluminum complex are produced by introducing a substituent group to a ligand of or by changing the metal of the 8-quinolinol-aluminum complex. They are:

(1) 8-quinolinol derivative-metal complex whose ligand is an 8-quinolinol derivative other than 8-quinolinol, (2) a metal complex whose ligand is 8-quinolinol and whose metal is either beryllium, magnesium, calcium, strontium, barium, scandium, lanthanoid, zinc, cadmium, yttrium, gallium, or indium, (3) selenoxine-metal complex and thiooxine-metal complex.

Like the 8-quinolinol-aluminum complex, these complexes named in (1), (2), (3) can exhibit luminescence in solid status and be used as a dopant or exclusively as an emitting material for the organic emitting layer. In these cases, no crystallization during the emission of luminescence or change in quality of the complexes are caused because of the excellent film-forming properties, contributing to long and stable luminescence of the devices.

In addition, the 8-quinolinol-aluminum complex and these complexes named in (1), (2), (3) can be used as a host material in the organic emitting layer to produce such EL devices capable of exhibiting long and stable luminescence.

The 8-quinolinol-aluminum complex and these complexes named in (1), (2), (3) can be used also for the electron transport layer because of their excellent electron transport characteristics. In this case as well, EL devices capable of exhibiting long and stable luminescence can be produced for the same reasons.

BRIEF DESCRIPTION OF THE DRAWINGS

These and other objects, advantages and features of the invention will become apparent from the following description thereof taken in conjunction with the accompanying drawings which illustrate an specific embodiment of the invention. In the drawings.

1FIG. 1 is a sectional view of an EL device of this invention having SH-A structure of two-layered structure.

DESCRIPTION OF THE PREFERRED EMBODIMENTS

Embodiment 1

EXAMPLE 1

Figure 1:
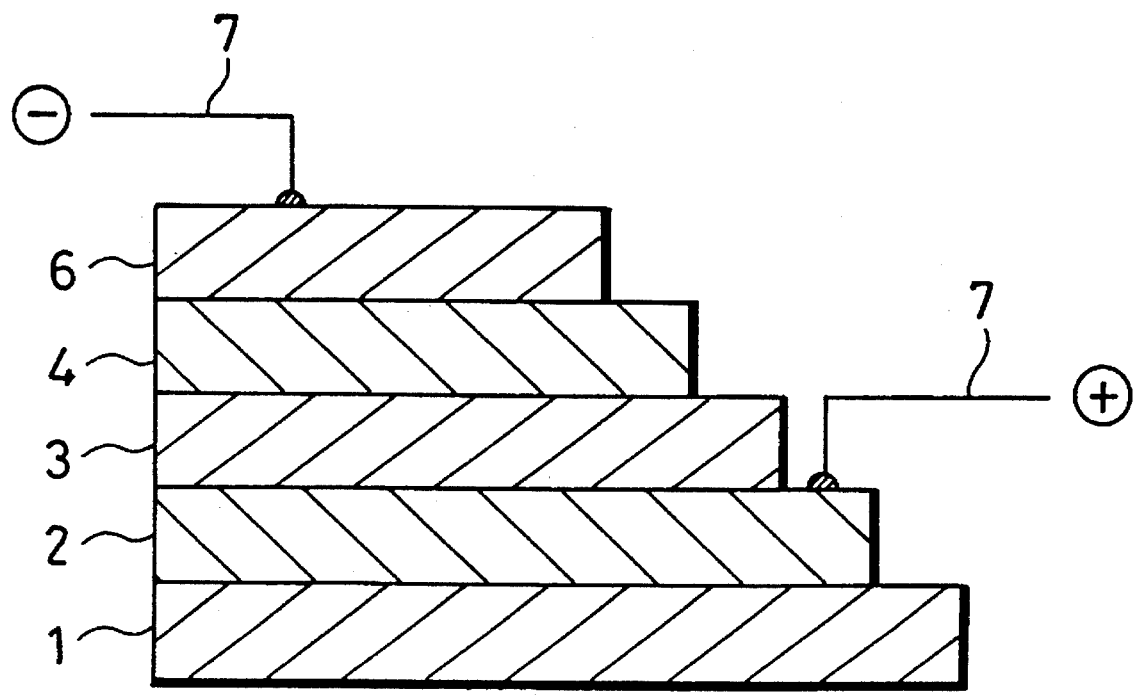

As shown in FIG. 1, the SH-A structure EL device of Embodiment 1 of this invention comprises a transparent glass substrate 1, a transparent hole injection electrode 2 (thickness: 1000 Å) layered thereon, a light transmittable organic hole transport layer 3 (thickness: 200 Å) further layered thereon, an organic emitting layer 4 (thickness: 1000 Å) still further layered thereon, and an electron injection electrode 6 (thickness: 2000 Å) finally layered thereon.

The hole injection electrode 2 as anode and the electron injection electrode 6 as cathode are each connected with a lead 7 so that they can be applied voltage.

An In-Sn oxide (ITO) is used for the hole injection electrode 2, polyvinyl carbazole shown in chemical formula 1 for the organic hole transport layer 3, a 2-methyl-8-quinolinol-gallium complex shown in chemical formula 2 for the organic emitting layer 4, and Mg-In in a ratio of 10:1 for the electron injection electrode 6.

[chemical formula 1]

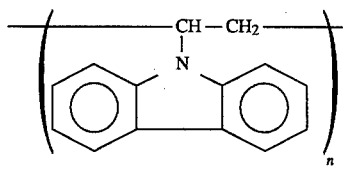

[chemical formula 2]

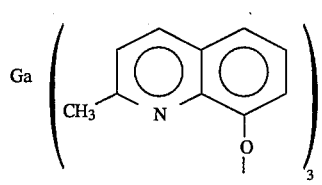

The above 2-methyl-8-quinolinol-gallium complex was synthesized as follows:

First, 2.4 g (15mmol) of 2-methyl-8-quinolinol (Wako Pure Chemical Industries, Ltd.) was dissolved in 100 ml of ethanol, and 0.88 g (5 mmol) of trihydric gallium chloride (Kishida Chemical Co., Ltd.) was dissolved in 200 ml of demineralized water. The 2-methyl-8-quinolinol ethanol solution thus produced was little by little added to the gallium chloride aqueous solution with stirring. Immediately, they began to react with each other, light green precipitates being observed. The stirring was continued for about 15 minutes until finally the precipitates were suction-filtered. They were completely dried and purified with the use of a sublimation apparatus (H. J. Wagner, R. O. Loutfy, and C. K. Hsiao; J. Mater. Sci. 172781 (1982)), which employs train sublimation method.

The EL device having the above-mentioned structure was produced as follows:

First, the glass substrate 1 having the hole injection electrode 2 thereon was ultrasonic cleaned with a neutral detergent, acetone, and ethanol each for 20 minutes. The substrate 1 was then kept in boiling ethanol for about 1 minute, taken out, and immediately air dried. Then, the polyvinyl carbazole was vacuum evaporated onto the hole injection electrode 2 to form the organic hole transport layer 3. Then, the 2-methyl-8-quinolinol-gallium complex was vacuum evaporated onto the organic hole transport layer 3 to form the organic emitting layer 4. Finally, Mg and In in a ratio of 10:1 were vacuum evaporated onto the organic emitting layer 4 to form the electron injection electrode 6. These evaporations were all conducted under the conditions of $1\times10^{-6}$ Torr of vacuum, 20° C. of the glass substrate 1 temperature, and 2 Å/sec of evaporating speed for the organic layers.

The EL device thus produced is hereinafter referred to as $A_1$ device.

EXAMPLES 2–6

The EL devices of these examples were produced in the same manner as in Example 1 except that each metal complex shown in chemical formulas 3 through 7 was used for the organic emitting layer 4 in place of the 2-methyl-8-quinolinol-gallium complex.

[chemical formula 3]

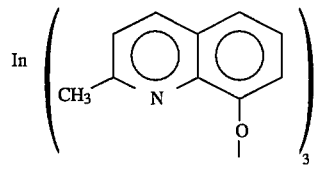

[chemical formula 4]

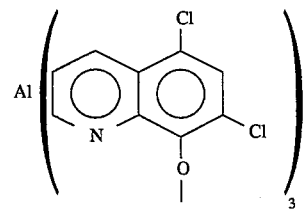

[chemical formula 5]

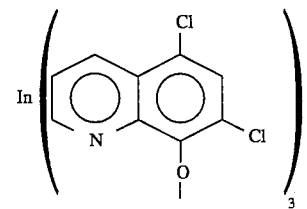

[chemical formula 6]

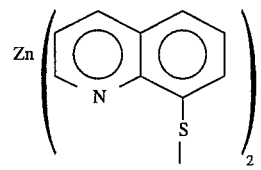

[chemical formula 7]

[chemical formula 7]

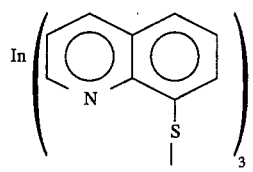

These five complexes were synthesized under the same conditions as the 2-methyl-8-quinolinol-gallium complex except that a sodium hydroxide aqueous solution was added to the mixture of a solution containing ions of a metal and a solution containing a compound used as a ligand in order to adjust their pH in a range between 4 and 8, thereby exhibiting the highest fluorescence. The EL devices thus produced are hereinafter referred to as $A_2$ device to $A_6$ device respectively.

EXAMPLES 7–16

The EL devices of these examples were produced in the same manner as in Example 1 except that both the organic emitting layer 4 and the organic hole transport layer 3 were made 500 Å thick; each metal complex shown in chemical formulas 8 through 17 was used for the layer 4 in place of the 2-methyl-8-quinolinol-gallium complex; and a diamine derivative shown in chemical formula 18 was used for the layer 3 in place of the polyvinyl carbazole.

[chemical formula 8]

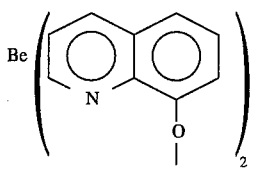

[chemical formula 9]

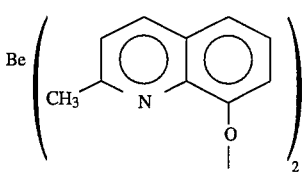

[chemical formula 10]

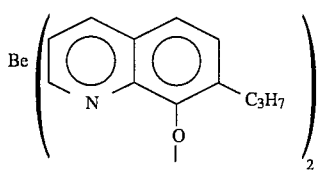

[chemical formula 11]

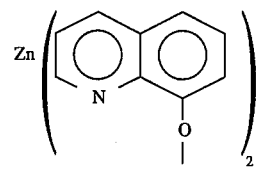

[chemical formula 12]

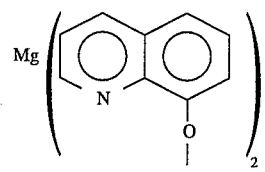

[chemical formula 13]

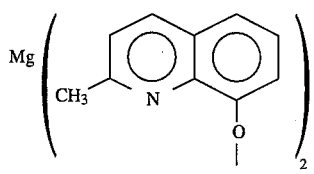

[chemical formula 14]

[chemical formula 15]

[chemical formula 16]

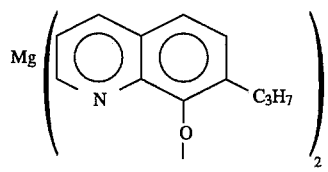

[chemical formula 17]

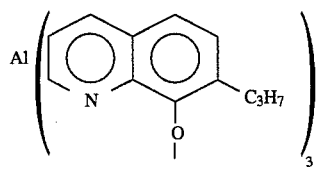

[chemical formula 18]

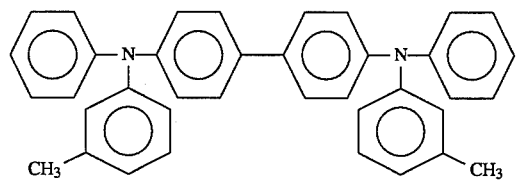

The above ten metal complexes were synthesized under the same conditions as in Examples 2 through 6. The EL devices thus produced are hereinafter referred to as $A_7$ device to $A_{16}$ device respectively.

Comparative Example 1

An EL device of this example was produced in the same manner as in Example 1 except that a diamine derivative shown in chemical formula 18 was used for the organic hole transport layer 3 (thickness: 500 Å) in place of the polyvinyl carbazole, a phtaloperinone derivative shown in chemical formula 19 for the organic emitting layer 4 (thickness: 500 Å) in place of the 2-methyl-8-quinolinol-gallium complex, and Mg—Ag in the ratio of 10:1 for the electron injection electrode 6 (thickness: 1500 Å) in place of Mg—In. The EL device thus produced is hereinafter referred to as $X_1$ device.

[chemical formula 19]

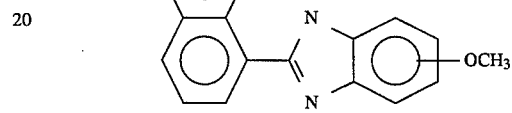

(Experiment 1)

Figure 2:
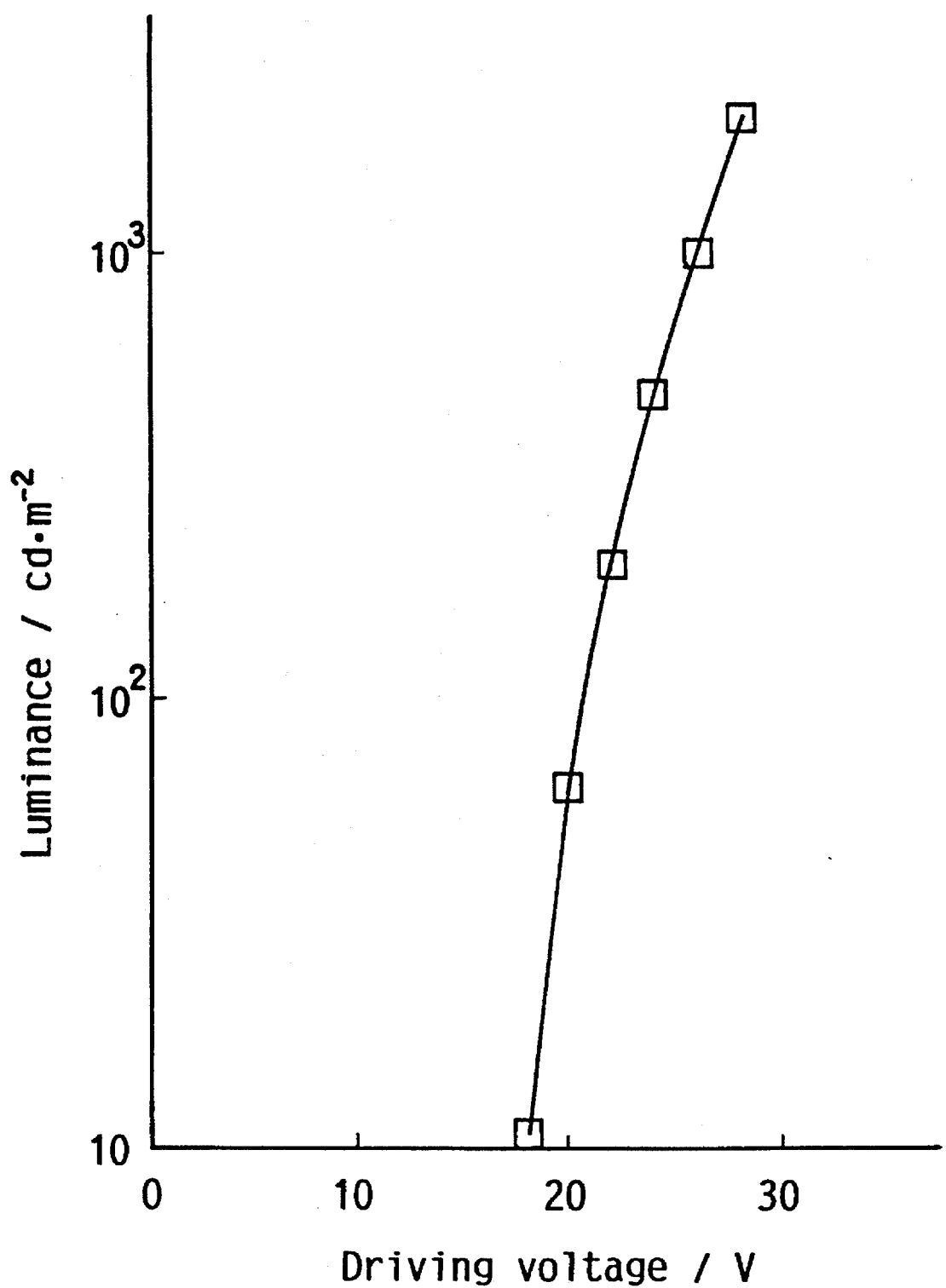
FIG. 2 shows the relationship between the luminance of $A_1$ device and the voltage.
Figure 3:
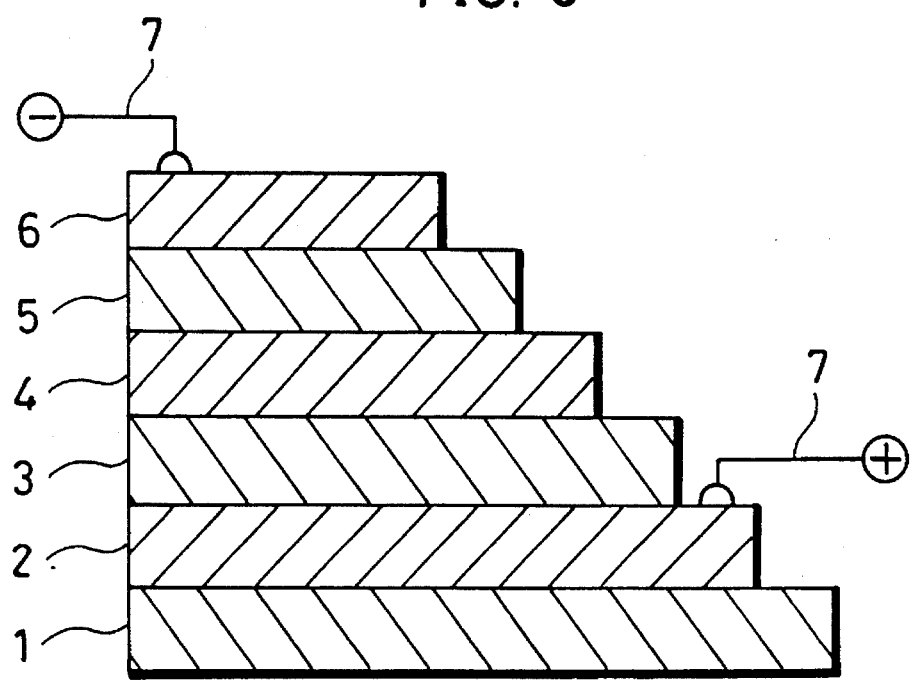
FIG. 3 is a sectional view of an EL device of this invention having three-layered structure.

The luminance, EL peak wavelength, durability, and emitting color of each of the EL devices $A_1$ through $A_{16}$ and $X_1$ in addition to the peak wavelength of the fluorescence of each complex used for these EL devices were measured by impressing a positive bias on the hole injection electrode 2 and a negative bias on the electron injection electrode 6. The results are shown in Table 1. FIG. 2 shows the relationship between the luminance of $A_1$ device and the voltage.

TABLE 1

| devices | PL/EL peak wave length (nm) | | luminance (cd/m²) | voltage (V) | current density (mA/cm²) | emitting Color | durability |
|---|---|---|---|---|---|---|---|
| $A_1$ | 494 | 513 | 2000 | 28 | 500 | blue-green | 1 wk. |
| $A_2$ | 533 | 535 | 1000 | 26 | 300 | yellow-green | 2 days |
| $A_3$ | 527 | 530 | 150 | 28 | 53 | yellow-green | 1 day |
| $A_4$ | 541 | 554 | 4 | 25 | 30 | yellow | stable |
| $A_5$ | 530 | 535 | 1.5 | 22 | 50 | yellow | stable |
| $A_6$ | 558 | 560 | 1 | 22 | 50 | yellow | stable |
| $A_7$ | 520 | 518 | 5500 | 20 | 270 | green | 2 wks. |
| $A_8$ | 503 | 518 | 8800 | 16 | 185 | green | 1 wk. |
| $A_9$ | 520 | 522 | 3000 | 20 | 200 | green | 1 wk. |
| $A_{10}$ | 535 | 568 | 16000 | 20 | 450 | yellow | 1 mth. |
| $A_{11}$ | 525 | 522 | 8900 | 20 | 360 | green | 2 wks. |
| $A_{12}$ | 540 | 540 | 3000 | 18 | 200 | yellow | 1 wk. |
| $A_{13}$ | 515 | 518 | 3700 | 26 | 170 | green | 1 wk. |
| $A_{14}$ | 515 | 515 | 3000 | 22 | 200 | green | 1 wk. |
| $A_{15}$ | 530 | 530 | 3000 | 20 | 200 | green | 1 wk. |
| $A_{16}$ | 528 | 564 | 3000 | 22 | 230 | yellow | 1 wk. |
| $X_1$ | 570 | 580 | 1 | 12 | 300 | yellow | 7 hrs. |

As apparent from Table 1, it was confirmed that the EL devices $A_1$ through $A_{16}$ of this invention had all higher durability as well as higher luminance than the conventional $X_1$ device.

EXAMPLE 17

Figure 4:
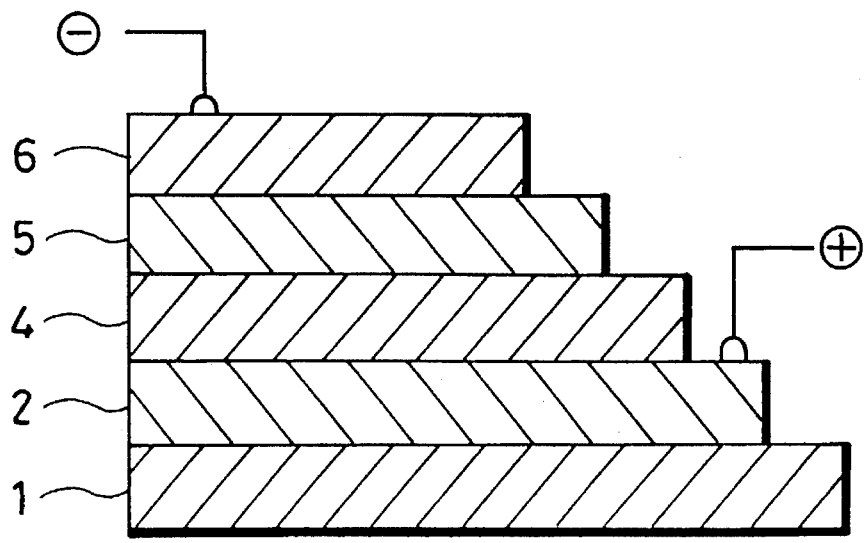
FIG. 4 is a sectional view of an EL device of this invention having SH-B structure of two-layered structure.

The EL device of this example was produced in the same manner as in Example 1 except that an organic electron transport layer 5 (thickness: 500 Å) made from an oxadiazole derivative shown in chemical formula 21 was additionally provided between the organic emitting layer 4 and the electron injection electrode 6 to form organic three-layered structure as shown in FIG. 4 and that the organic hole transport layer 3 and the organic emitting layer 4 were made 500 Å and 50 Å thick respectively, being made from the diamine derivative shown in chemical formula 18 and a 2-methyl-8-quinolinol-beryllium complex shown in chemical formula 20 respectively.

[chemical formula 20]

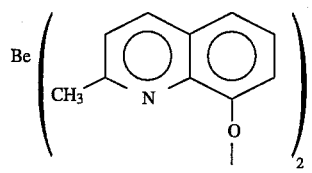

[chemical formula 21]

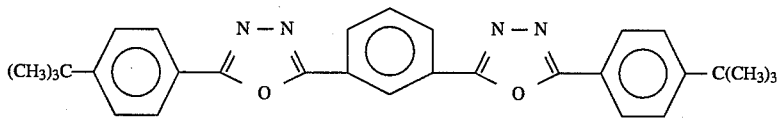

The 2-methyl-8-quinolinol-beryllium complex was synthesized under the same conditions as the 2-methyl-8-quinolinol-gallium complex except that a sodium hydroxide aqueous solution was added to the mixture of a solution containing ions of a metal and a solution containing a compound used as a ligand in order to adjust the pH to 7. The EL device thus produced is hereinafter referred to as $A_{17}$ device.

Comparative Example 2

An EL device of this example was produced in the same manner as in Example 17 except that a butadiene derivative shown in chemical formula 22 was used for the organic emitting layer 4 in place of the 2-methyl-8-quinolinol-beryllium complex, and tBu-PBD shown in chemical formula 23 was used for the organic electron transport layer 5 in place of the oxadiazole derivative shown in chemical formula 21. The EL device thus produced is hereinafter referred to as $X_2$ device.

[chemical formula 22]

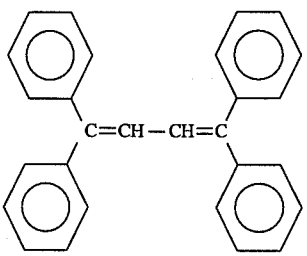

[chemical formula 23]

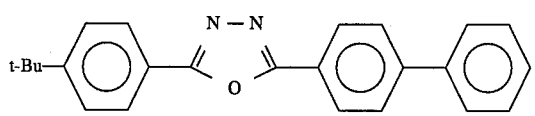

(Experiment 2)

The luminance, EL peak wavelength, durability, and emitting colors of the $A_{17}$ device of this invention and the $X_2$ device of Comparative Example 2 in addition to the peak wavelength of the fluorescence of each complex used for these EL devices were measured by impressing a positive bias on the hole injection electrode 2 and a negative bias on the electron injection electrode 6. The results are shown in Table 2.

TABLE 2

| deveces | PL/EL peak wave length (nm) | | luminance (cd/m$^2$) | voltage (V) | current density (mA/cm$^2$) | emitting color | durability |
| --- | --- | --- | --- | --- | --- | --- | --- |
| $A_{17}$ | 502 | 515 | 2200 | 18 | 160 | green | 1 wk. |
| $X_2$ | 432 | 430 | 800 | 18 | 150 | blue | 1 hr. |

As apparent from Table 2, it was confirmed that the device of this invention had higher durability as well as higher luminance than the $X_2$ device of Comparative Example 2.

OTHER EXAMPLES

Although the organic emitting layer 4 was made by using a single organic material in the above embodiments, it can be formed by a doping method. In such doping method, these four complexes used in this invention: 8-quinolinol derivative-metal complex, 8-quinolinol-metal complex, thiooxine-metal complex, and selenoxine-metal complex can be used as either a dopant or a host material. The actual combinations of a dopant and a host material are shown in Table 3.

TABLE 3

| Dopants | Host materials |
|---|---|
| 8-quinolinol-zinc complex (Chemical Formula 11) | 8-quinolinol-aluminum complex (C.F. 24) |
| 7-propyl-8-quinolinol-beryllium complex (C.F. 10) | |
| 2-methyl-8-quinolinol-beryllium complex (C.F. 9) | 2-methyl-8-quinolinol-gallium complex (C.F. 2) |
| 8-quinolinol-beryllium complex (C.F. 8) | |
| 2-methyl-8-quinolinol-magnesium complex (C.F. 15) | |
| 8-quinolinol-magnesium complex (C.F. 14) | |
| 2-methyl-8-quinolinol-zinc complex (C.F. 12) | |
| quinacridone derivative (C.F. 25) | 8-quinolinol-zinc complex (C.F. 11) |
| | 2-methyl-8-quinolinol-zinc complex (C.F. 12) |
| | 8-quinolinol-beryllium complex (C.F. 8) |
| | 2-methyl-8-quinolinol-beryllium complex (C.F. 9) |
| | 2-methyl-8-quinolinol-gallium complex (C.F. 2) |

[chemical formula 24]

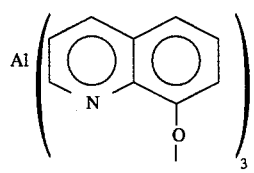

[chemical formula 25]

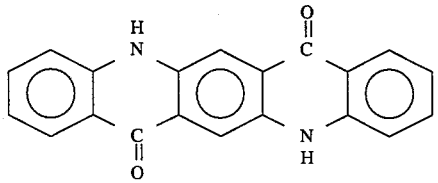

Besides the ligands mentioned above, these named below can be used as well. They are 2-alkyl-8-quinolinol (chemical formula 26) in which the alkyl chain at the 2-position has 2 to 5 carbon number, 7-alkyl-8-quinolinol (chemical formula 27) in which the alkyl chain at the 7-position has either 1, 2, 4, or 5 carbon number, the 5-X-7-Y-8-quinolinol (chemical formula 28), 5-sulfo-8-quinolinol (chemical formula 29), 5-alkylioxymethyl-8-quinolinol (chemical formula 30), 7-acyloxy-8-quinolinol (chemical formula 31), and selenoxine (chemical formula 32). The 5-and 7-positions of the 5-X-7-Y-8-quinolinol are substituted by other combination of halogen than those mentioned above.

[chemical formula 26]

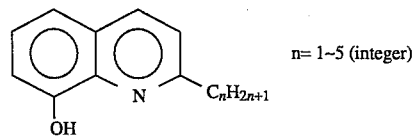

n = 1~5 (integer)

[chemical formula 27]

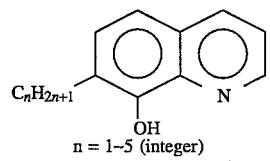

n = 1~5 (integer)

[chemical formula 28]

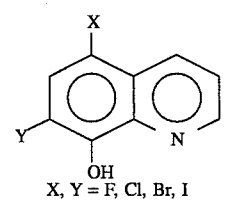

X, Y = F, Cl, Br, I

[chemical formula 29]

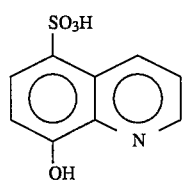

[chemical formula 30]

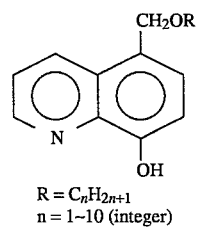

$R = C_nH_{2n+1}$
n = 1~10 (integer)

[chemical formula 31]

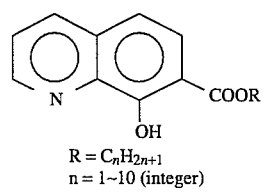

$R = C_nH_{2n+1}$
n = 1~10 (integer)

[chemical formula 32]

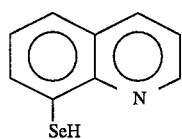

Besides the metals used in this embodiment, the following can be used: cadmium, yttrium, scandium, calcium, strontium, barium, cerium, samarium, europium, lanthanum, terbium or the like.

Embodiment 2

EXAMPLE 1

As shown in FIG. 4, the EL device of this example was produced in the same manner as in Example 1 of Embodiment 1 except that the EL device was made in the SH-B structure in which the hole injection electrode 2, the organic emitting layer 4 (500 Å), the organic electron transport layer 5 (500 Å), and the electron injection electrode 6 (2000 Å) were layered in this order onto the glass substrate 1 and that an oxadiazole derivative shown in chemical formula 33 was used for the organic emitting layer 4, the 2-methyl-8-quinolinol gallium complex shown in chemical formula 2 for the organic electron transport layer 5, and Mg—Ag in a ratio of 10:1 for the electron injection electrode 6. The EL device thus produced is hereinafter referred to as $B_1$ device.

[chemical formula 33]

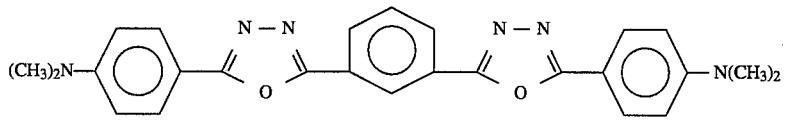

Comparative Example 1

The EL device of this example was produced in the same manner as in Example 1 of Embodiment 2 except that tBu-PBD shown in chemical formula 23 was used for the organic electron transport layer 5 in place of the 2-methyl-8-quinolinol gallium complex. The EL device thus produced is hereinafter referred to as $Y_1$ device.

(Experiment 1)

The luminance, EL peak wavelength, and durability of the devices $B_1$ and $Y_1$ were measured by impressing a positive bias on the hole injection electrode 2 and a negative bias on the electron injection electrode 6.

The $B_1$ device exhibited the emitting color of green with 600 cd/m$^2$ luminance whose peak wavelength was 525 nm when the driving voltage was 16 V and the current was 120 mA/cm$_2$. The device emitted luminescence for two days continuously.

The $Y_1$ device exhibited the same emitting color of green with 500 cd/m$^2$ luminance whose peak wavelength was also 525 nm when the driving voltage was 15V and the current was 130mA/cm$_2$. However, this device could not emit luminescence more than two hours continuously, thus proving poor stability.

Example 2

The EL device of this example was produced in the same manner as in Example 1 of Embodiment 2 except that the organic hole transport layer 3 (500 Å) made from the polyvinyl carbazole shown in chemical formula 1 was additionally provided between the hole injection electrode 2 and the organic emitting layer 4; the layer 4 was made 100 Åthick; and that a perinone derivative shown in chemical formula 34 was used for the organic emitting layer 4 in place of the oxadiazole derivative and an 8-quinolinol-aluminum complex shown in chemical formula 35 was used for the organic electron transport layer 5 in place of the 2-methyl-8-quinolinol gallium complex.

[chemical formula 34]

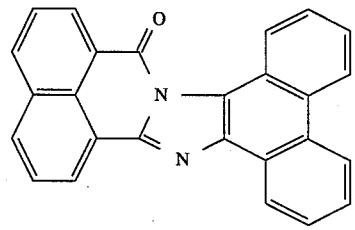

[chemical formula 35]

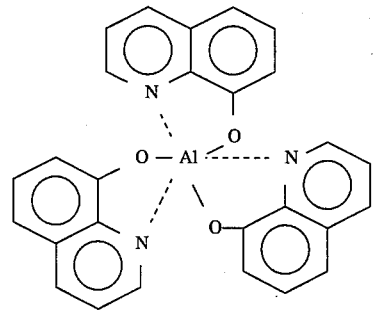

The EL device thus produced is hereinafter referred to as $B_2$ device.

The 8-quinolinol-aluminum complex was synthesized in the same manner as the 2-methyl-8-quinolinol gallium complex of Example 1 of Embodiment 1 except that 8-quinolinol (Tokyo Chemical Industry) was used as a ligand and aluminum potassium sulfate dodecahydrate (potassium alum) was used as a reagent.

Example 3

The EL devices of this example were produced in the same manner as in Example 2 of Embodiment 2 except that each 8-quinolinol derivative-metal complex shown in chemical formulas 36–40 was used for the organic electron transport layer 5 in place of the 8-quinolinol-aluminum complex. The EL devices thus produced are hereinafter referred to as $B_3$ through $B_7$ devices.

These five metal complexes were synthesized in the same manner as the 2-methyl-8-quinolinol gallium complex of Example 1 of Embodiment 1. In the synthesis, gallium ions and yttrium ions were respectively obtained by dissolving gallium chloride ($GaCL_3$) and yttrium nitrate hexahydrate in demineralized water.

[chemical formula 36]

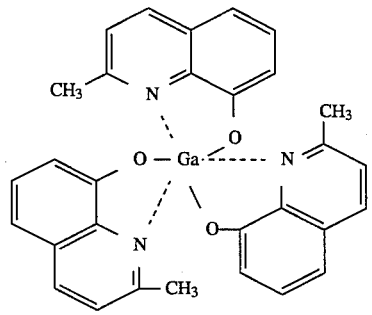

[chemical formula 37]

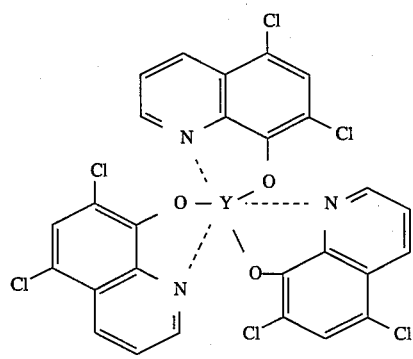

[chemical formula 38]

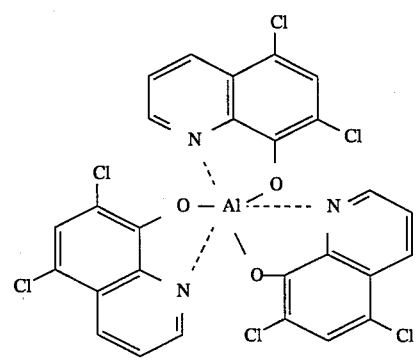

[chemical formula 39]

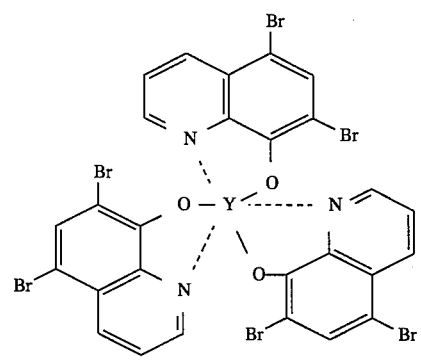

[chemical formula 40]

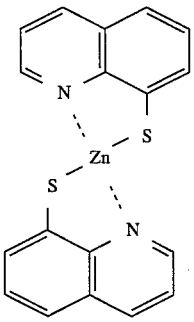

Comparative Example 2

The EL device of this example was produced in the same manner as in Example 2 of Embodiment 2 except that the tBu-PBD (Dojin Chemicals) shown in chemical formula 23, which was conventionally used for the organic electron transport layer 5 was used in place of the 8-quinolinol-aluminum complex. The EL device thus produced is hereinafter referred to as $Y_2$ device.

(Experiment 2)

The luminance, EL peak wavelength, and durability of each of the devices $B_2$ through $B_7$ of Examples 1 and 2 and the $Y_2$ device of Comparative Example 2 were measured by impressing a positive bias on the hole injection electrode 2 and a negative bias on the electron injection electrode 6. The results are shown in Table 4.

TABLE 4

| devices | EL wave length (nm) | luminance (cd/m²) | voltage (V) | current density (mA/cm²) | emitting color | durability |
|---|---|---|---|---|---|---|
| $B_2$ | 590 | 950 | 16 | 130 | yellow | 4 days |
| $B_3$ | 590 | 850 | 16 | 120 | yellow | 4 days |
| $B_4$ | 590 | 800 | 17 | 150 | yellow | 4 days |
| $B_5$ | 590 | 900 | 16 | 130 | yellow | 4 days |
| $B_6$ | 590 | 750 | 15 | 120 | yellow | 3 days |
| $B_7$ | 590 | 620 | 18 | 130 | yellow | 2 days |
| $Y_2$ | 590 | 600 | 16 | 125 | yellow | 2 hrs. |

As apparent from Table 4, using tBu-PBD which was a conventional material for the organic electron transport layer 5 promoted undesired crystallization, thereby shortening the luminescent life. On the other hand, using an 8-quinolinol derivative-metal complex instead, which had good film forming properties, could maintain the life much longer.

OTHER EXAMPLES

The 2-methyl-8-quinolinol-gallium complex used as an electron transport material of the $B_1$ device has the fluorescence whose peak wavelength is 494 nm, which means that the complex has high exciton energy. Therefore, the complex can be used for the organic electron transport layer when a material for blue luminescence is used for the emitting layer.

A metal complex having as its ligand an 8-quinolinol derivative whose OH fragment at the 8-position is substituted by —SeH fragment can be used for the organic electron transport layer 5 to obtain the same effects, though this is not described in the above embodiments.

Used as metals in the above embodiments were gallium, yttrium, aluminum, and zinc; however, beryllium, magnesium, strontium, indium or the like can be used as well.

Since the complexes shown in both chemical formulas 2 and 17 have electron transport properties, they can be used as materials for the organic electron transport layer as well.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An EL device having a hole injection electrode, an electron injection electrode, and at least an organic emitting layer therebetween, said organic emitting layer comprising an 8-quinolinol derivative-metal complex whose ligand is selected from the group consisting of chemical formulas 102 through 106 chemical formula 102

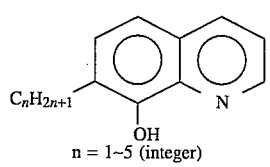

n = 1~5 (integer)

chemical formula 103

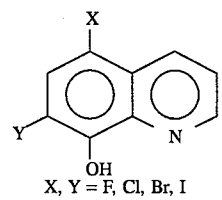

X, Y = F, Cl, Br, I chemical formula 104

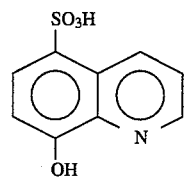

chemical formula 105

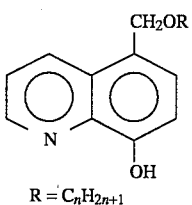

R = $C_nH_{2n+1}$
n = 1~10 (integer)

chemical formula 106

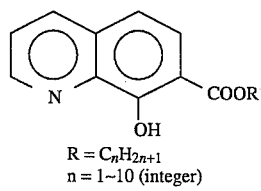

R = $C_nH_{2n+1}$
n = 1~10 (integer)

wherein the metal of said 8-quinolinol derivative-metal complex is selected from the group consisting of beryllium, magnesium, calcium, strontium, barium zinc, cadmium., aluminum, gallium and indium.

2. The EL device of claim 1, wherein the ligand of said 8-quinolinol derivative-metal complex is a 7-n-propyl-8-quinolinol.

3. The EL device of claim 1 having SH-A structure holding an organic hole transport layer between said hole injection electrode and said organic emitting layer.

4. The EL device of claim 1 having DH structure holding an organic hole transport layer between said hole injection electrode and said organic emitting layer, and an organic electron transport layer between said organic emitting layer and said electron injection electrode.

5. The EL device of claim 1, wherein said 8-quinolinol derivative-metal complex is used as a dopant in the organic emitting layer.

6. The EL device of claim 1, wherein said 8-quinolinol derivative-metal complex is used as a host material in the organic emitting layer.

7. The EL device of claim 3, wherein said organic hole transport layer comprises one of polyvinylcarbazole shown in chemical formula 107 and a diamine derivative shown in chemical formula 108, while said organic emitting layer comprises one of these compounds shown in chemical formulas 111, 112, 114, 118 and 119:

chemical formula 107

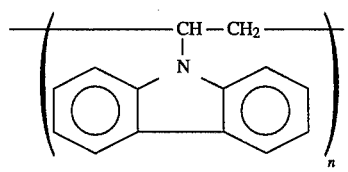

chemical formula 108

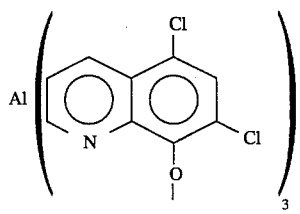

chemical formula 111

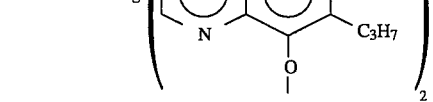

chemical formula 112

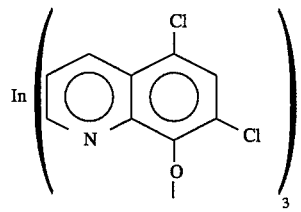

chemical formula 114

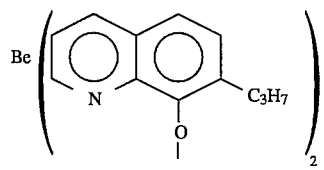

chemical formula 118

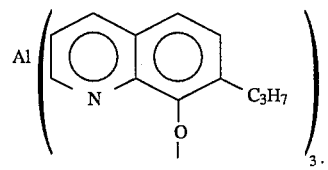

chemical formula 119

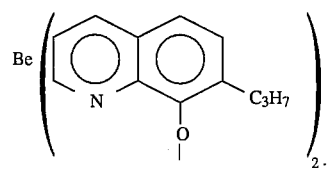

8. The EL device of claim 5, wherein said 8-quinolinol derivative-metal complex is selected from the group consisting of chemical formula:

chemical formula 123

9. An EL device having a hole injection electrode, an electron injection electrode, and at least an organic emitting layer therebetween, said organic emitting layer comprising one of a thiooxine-metal complex and a selenoxine-metal complex.

10. The EL device of claim 9, wherein the metal of the metal complex is selected from the group consisting of beryllium, magnesium, calcium, strontium, barium, scandium, yttrium, zinc, cadmium, aluminum, gallium, indium, lanthanum, cerium, samarium, europium, and terbium.

11. The EL device of claim 10 having SH-A structure holding an organic hole transport layer between said hole injection electrode and said organic emitting layer.

12. The EL device of claim 10 having DH structure holding an organic hole transport layer between said hole injection electrode and said organic emitting layer, and an organic electron transport layer between said organic emitting layer and said electron injection electrode.

13. The EL device of claim 9, wherein the metal complex is used as a dopant.

14. The EL device of claim 9, wherein the metal complex is used as a host material.

15. An EL device having a hole injection electrode, an electron injection electrode, and at least an organic emitting layer and an electron transport layer therebetween, said organic electron transport layer comprising an 8-quinolinol derivative-metal complex whose ligand is selected from the group consisting of chemical formulas 102 through 106:

chemical formula 102

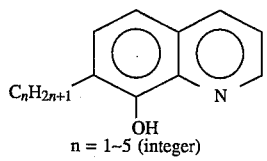

$C_nH_{2n+1}$
OH
n = 1~5 (integer)

chemical formula 103

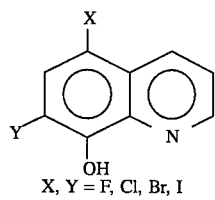

X, Y = F, Cl, Br, I chemical formula 104

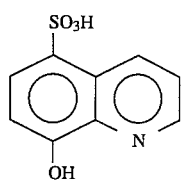

chemical formula 105

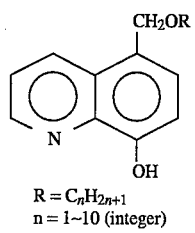

$R = C_nH_{2n+1}$
n = 1~10 (integer)

chemical formula 106

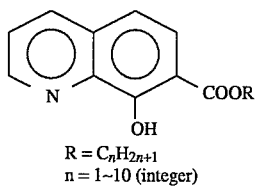

$R = C_nH_{2n+1}$
n = 1~10 (integer)

wherein the metal of said 8-quinolinol derivative-metal complex is selected from the group consisting of beryllium, magnesium calcium, strontium, barium, zinc, cadmium, aluminum, gallium and indium.

16. The EL device of claim 15, wherein the metal of said 8-quinolinol derivative-metal complex is selected from metals belonging to one of the II group and the III group in the periodic table.

17. The EL device of claim 16 having SH-B structure holding said organic emitting layer and said organic electron transport layer between said electrodes.

18. The EL device of claim 16 having DH structure holding an organic hole transport layer between said hole injection electrode and said organic emitting layer.

19. An EL device having a hole injection electrode, an electron injection electrode, and at least an organic emitting layer and an organic electron transport layer between said electrodes, said organic electron transport layer comprising one of a thiooxine-metal complex and a selenoxine-metal complex.

20. The EL device of claim 19, wherein the metal of the metal complex is selected from metals belonging to one of the II group and the III Group in the periodic table.

21. The EL device of claim 20 having SH-B structure holding said organic emitting layer and said organic electron transport layer between said electrodes.

22. The EL device of claim 20 having DH structure holding an organic hole transport layer between said hole injection electrode and said organic emitting layer.

23. The EL device of claim 11, wherein said organic hole transport layer comprises polyvinylcarbazole shown in chemical formula 140, said organic emitting layer comprises one of these compounds shown in chemical formulas 141 and 142:

chemical formula 140

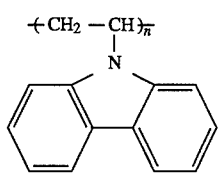

chemical formula 141

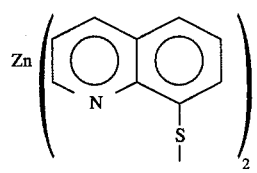

chemical formula 142

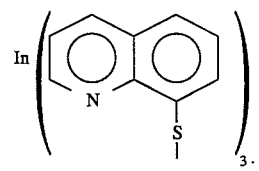

24. The EL device of claim 18, wherein said organic emitting layer comprises a perynone derivative shown in chemical formula 148, said organic hole transport layer comprises polyvinylcarbazole shown in chemical formula 149, and said organic electron transport layer comprises one of these compounds shown in chemical formulas 152, 153 and 154:

chemical formula 148

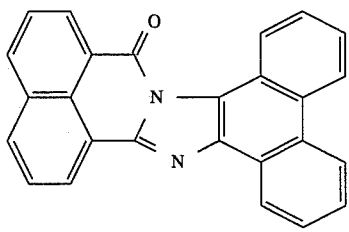

chemical formula 149

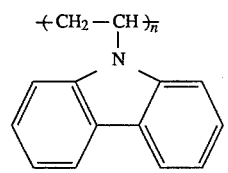

chemical formula 152

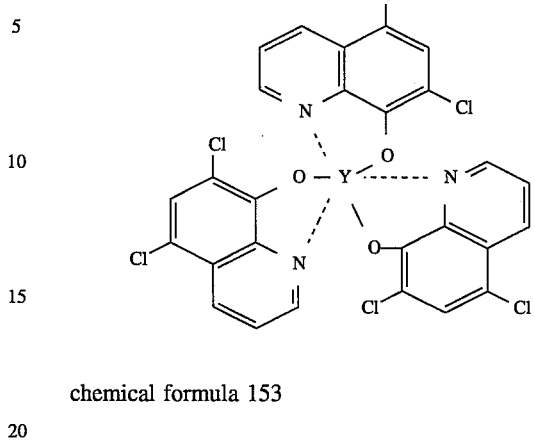

chemical formula 153

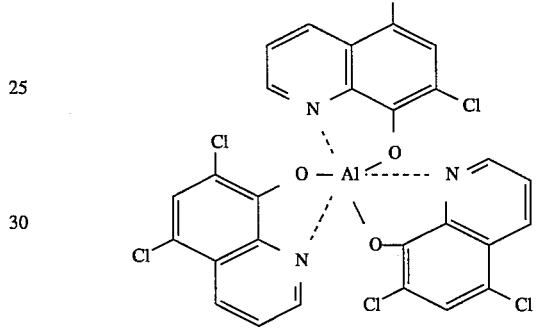

chemical formula 154

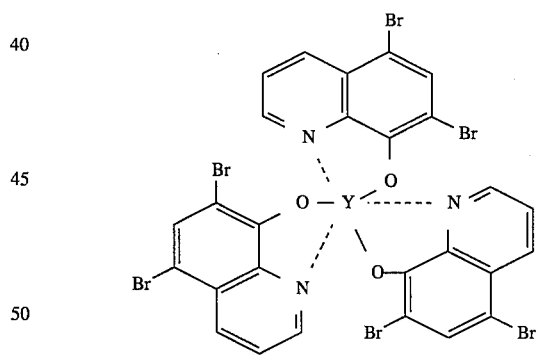

25. The EL device of claim 21, wherein said organic emitting layer comprises a perynone derivative shown in chemical formula 155, said organic hole transport layer comprises polyvinylcarbazole shown in chemical formula 156, and said organic electron transport layer comprises a compound shown in chemical formula 157:

chemical formula 155

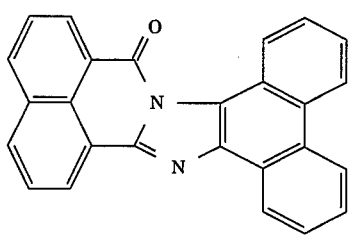
chemical formula 156
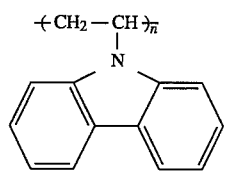
chemical formula 157
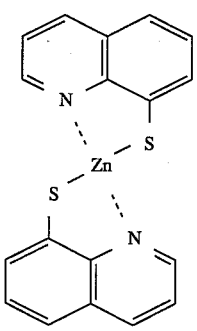
* * * * *